Oct. 9, 1962 H. C. VERNON ETAL 3,058,093

CHARACTER RECOGNITION METHOD AND APPARATUS

Filed Dec. 26, 1957 7 Sheets-Sheet 1

INVENTORS
HARCOURT C. VERNON
ROBERT R. WALSH

BY Harry J. McCauley

ATTORNEY

INVENTORS
HARCOURT C. VERNON
ROBERT R. WALSH

BY Harry J. McCauley
ATTORNEY

INVENTORS
HARCOURT C. VERNON
ROBERT R. WALSH
Harry J. McCauley
ATTORNEY

Oct. 9, 1962 H. C. VERNON ETAL 3,058,093

CHARACTER RECOGNITION METHOD AND APPARATUS

Filed Dec. 26, 1957

7 Sheets-Sheet 4

INVENTORS
HARCOURT C. VERNON
ROBERT R. WALSH

BY Harry J. McCauley

ATTORNEY

INVENTORS
HARCOURT C. VERNON
ROBERT R. WALSH
BY Harry J. McCauley
ATTORNEY

CHARACTER RECOGNITION METHOD AND APPARATUS

Filed Dec. 26, 1957 7 Sheets-Sheet 6

INVENTORS
HARCOURT C. VERNON
ROBERT R. WALSH

BY Harry J. McCauley

ATTORNEY

CHARACTER RECOGNITION METHOD AND APPARATUS

Filed Dec. 26, 1957

INVENTORS
HARCOURT C. VERNON
ROBERT R. WALSH

BY Harry J. McCauley
ATTORNEY

United States Patent Office 3,058,093

Patented Oct. 9, 1962

3,058,093

CHARACTER RECOGNITION METHOD AND APPARATUS

Harcourt C. Vernon and Robert R. Walsh, Wilmington, Del., assignors to E. I. du Pont de Nemours and Company, Wilmington, Del., a corporation of Delaware Filed Dec. 26, 1957, Ser. No. 705,163

9 Claims. (Cl. 340—146.3)

Figure 1:
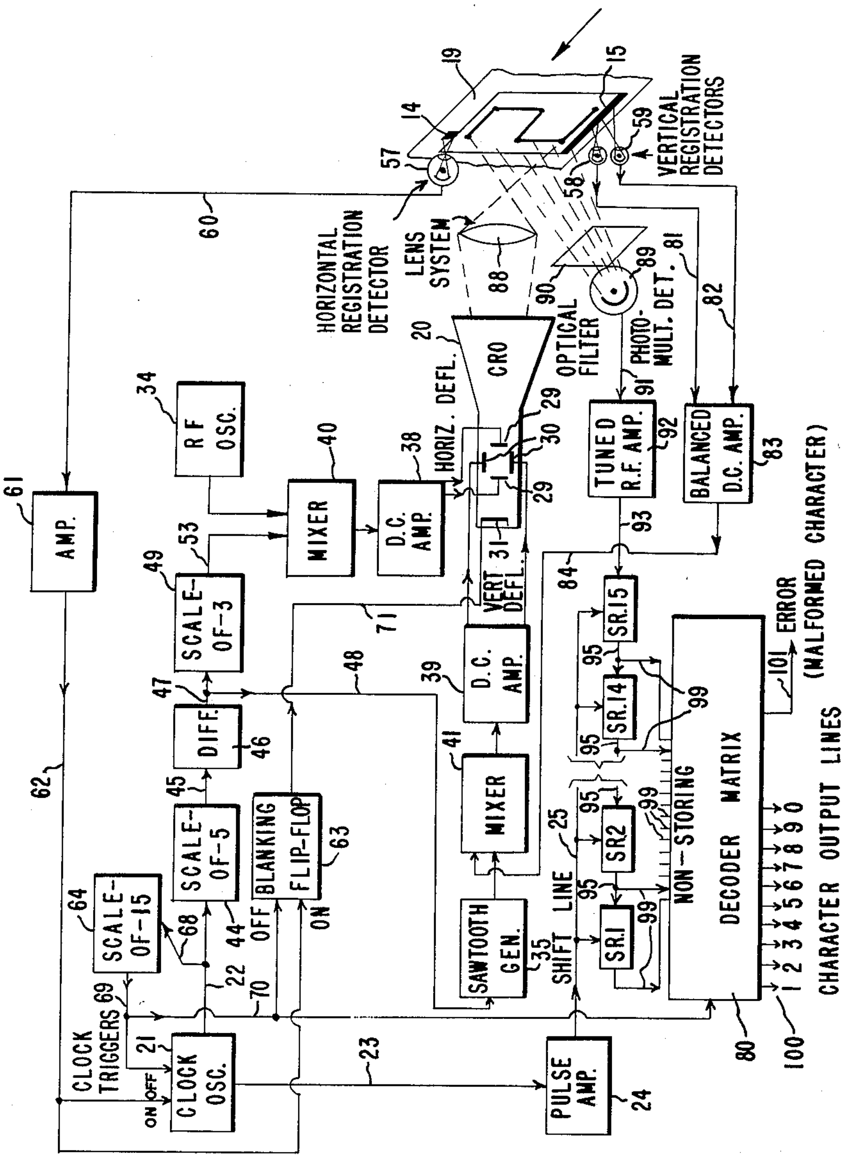

This invention relates to a method and apparatus for character recognition, and particularly to a method and apparatus for the recognition of handwritten characters such as numerals, letters of the alphabet and the like.

There have been numerous attempts in the prior art to reproduce printed characters, such as by the well-known methods af facsimile reproduction, for example, wherein the objective has been to obtain as faithful a reproduction of the character examined as possible by literal copying techniques. Facsimile reproduction thus involves no "recognition" operation, by which is meant a unique association of the character examined with the numerical integers or the alphabet, as the case may be. Quite recently there has been conceived reading apparatus for the blind, such as that disclosed in U.S. Patent 2,616,983 which utilizes recognition as an essential element of a combinative operation. Even more recently an apparatus for identifying line tracks has been disclosed in U.S. Patent 2,738,499 which appears to utilize a joint recognition-reproduction technique which, it is understood, is satisfactory in operation where the characters to be examined are systematically printed in accordance with a rigid format but has not displayed acceptable accuracy in discernment as regards handwritten characters.

The recognition of handwritten characters is a serious problem in the conduct of modern business. The vast majority of the original records prepared in the daily conduct of business are handwritten, most often on preprinted forms, and the processing of the information contained in the records perforce necessitates communication to manifold organizational agencies in order to serve the purposes for which the original record was prepared in the first place. Information collection, collation and transmission require repetitive copying operations, each of which involves a character recognition step, which is often accomplished by human reading with attendant tedium, introduction of error and high financial cost. The arvance of technology in the office machine field has provided apparatus capable of handling information magnetically and electronically at very high speeds and reliability, but the obstacle to full use of this equipment has been the laborious introduction therein of the individual bits of original information. The most critical operation of all in this introduction of information has been that of character recognition and most of the difficulty in this regard is attributable to the fact that, despite individualities in handwriting style and record appearance, the characters must be recognized positively for their true nature, whereas all else must be disregarded as background interference of no significance to the information gathering.

Figure 2:
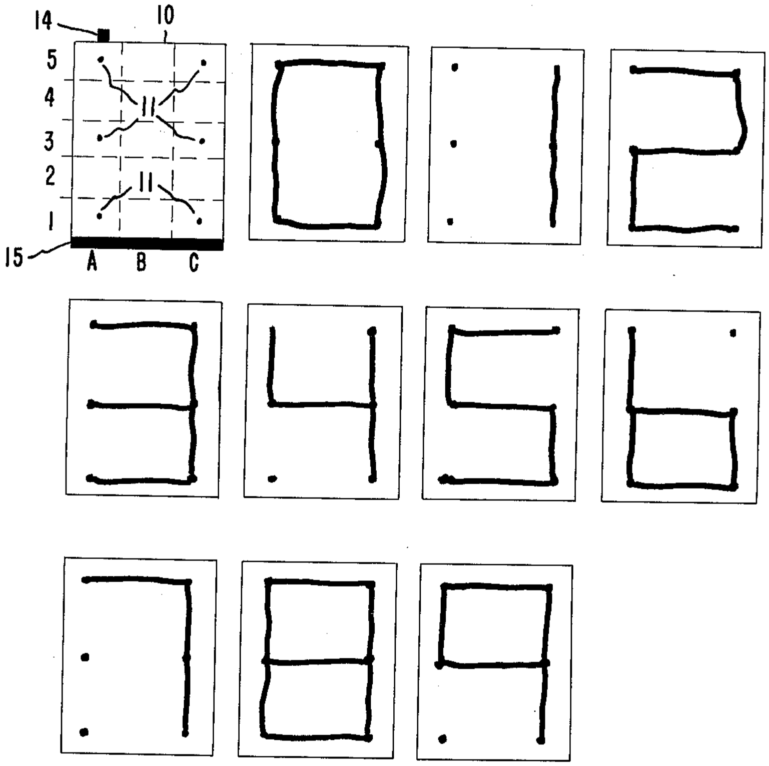
Figure 3:
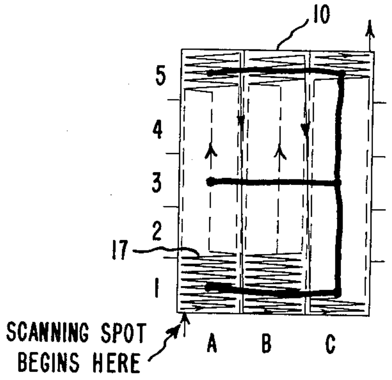
Figure 4:
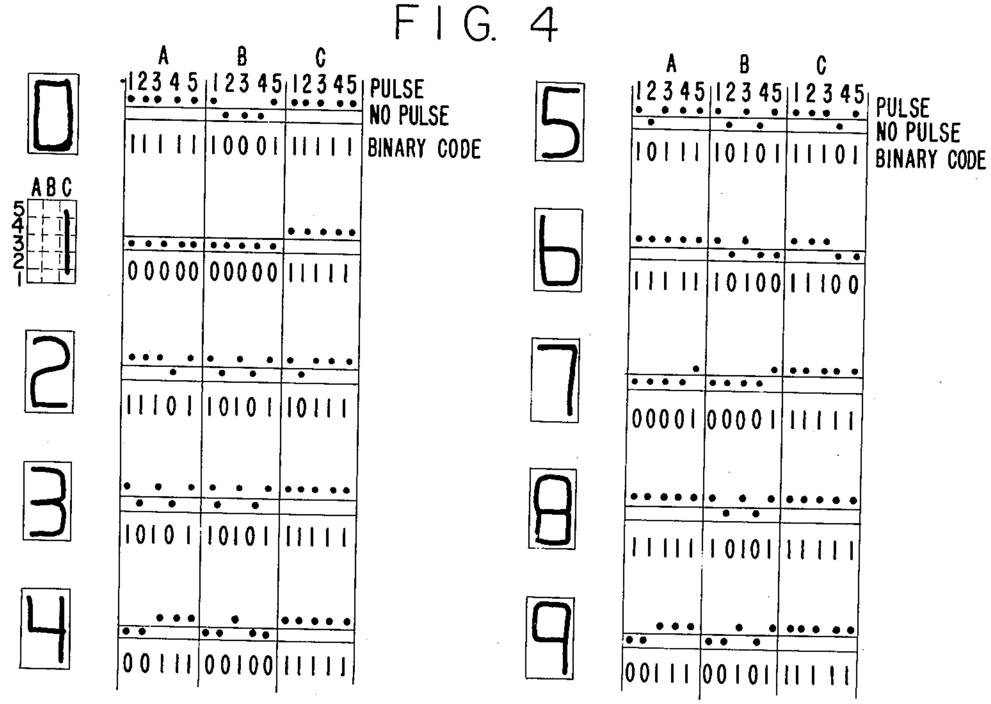
Figure 5:
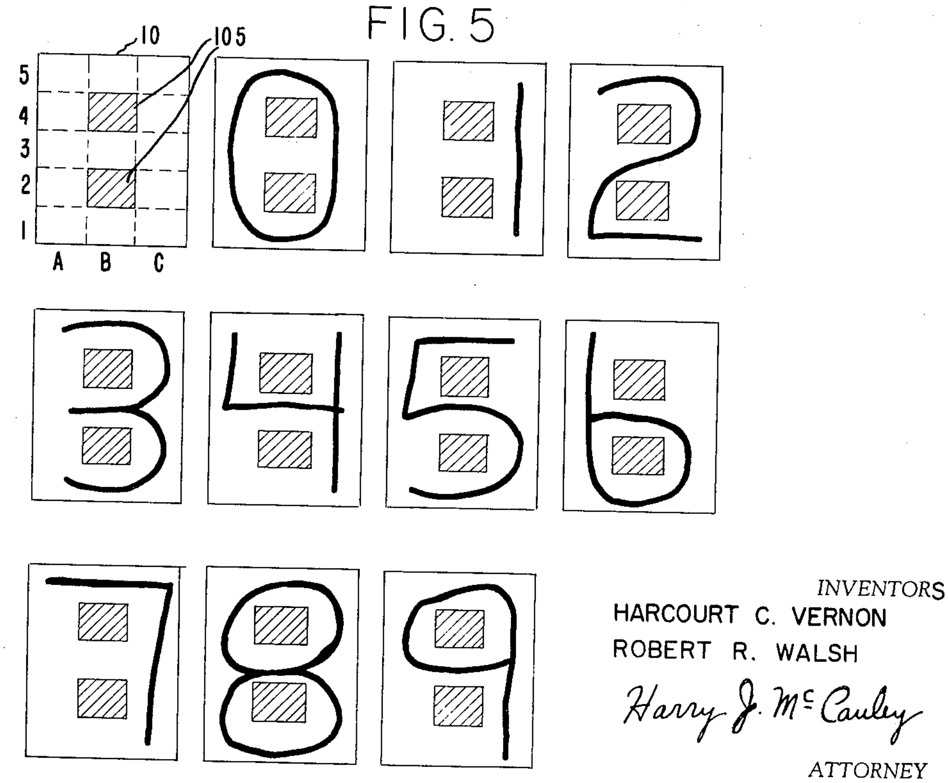
Figure 6:
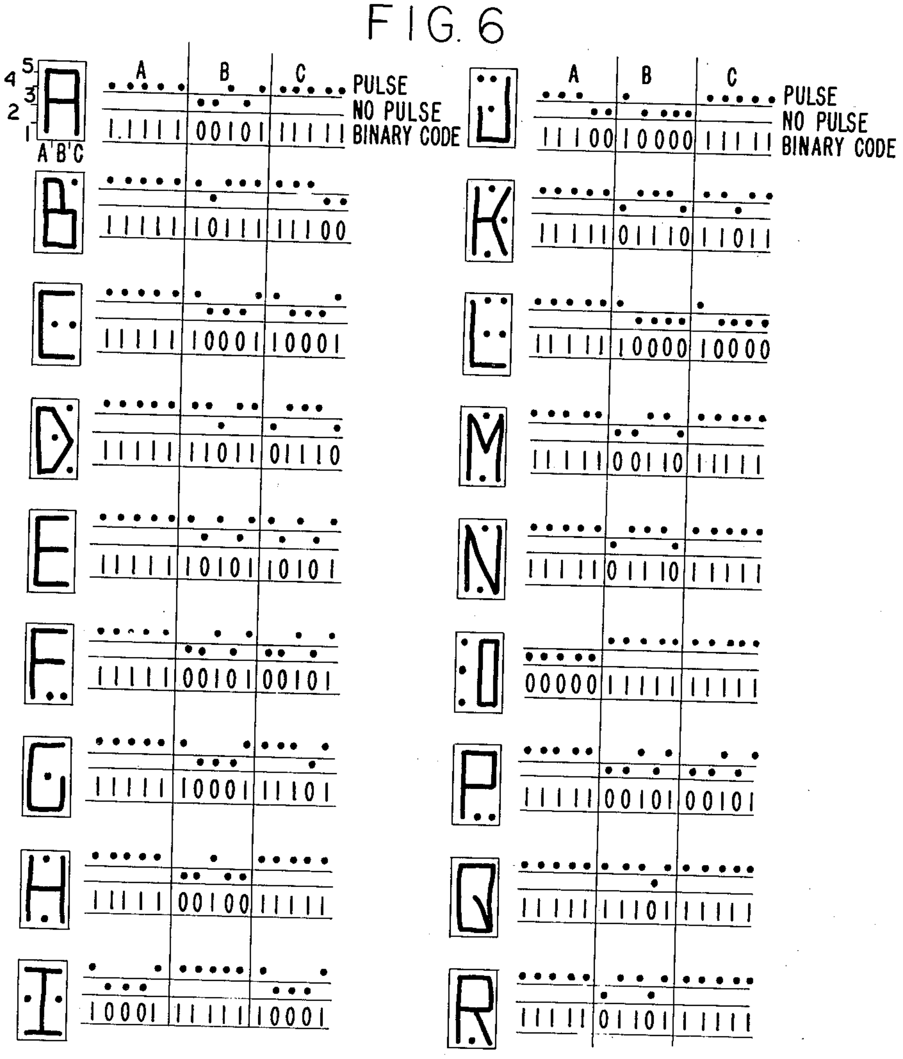
Figure 6A:
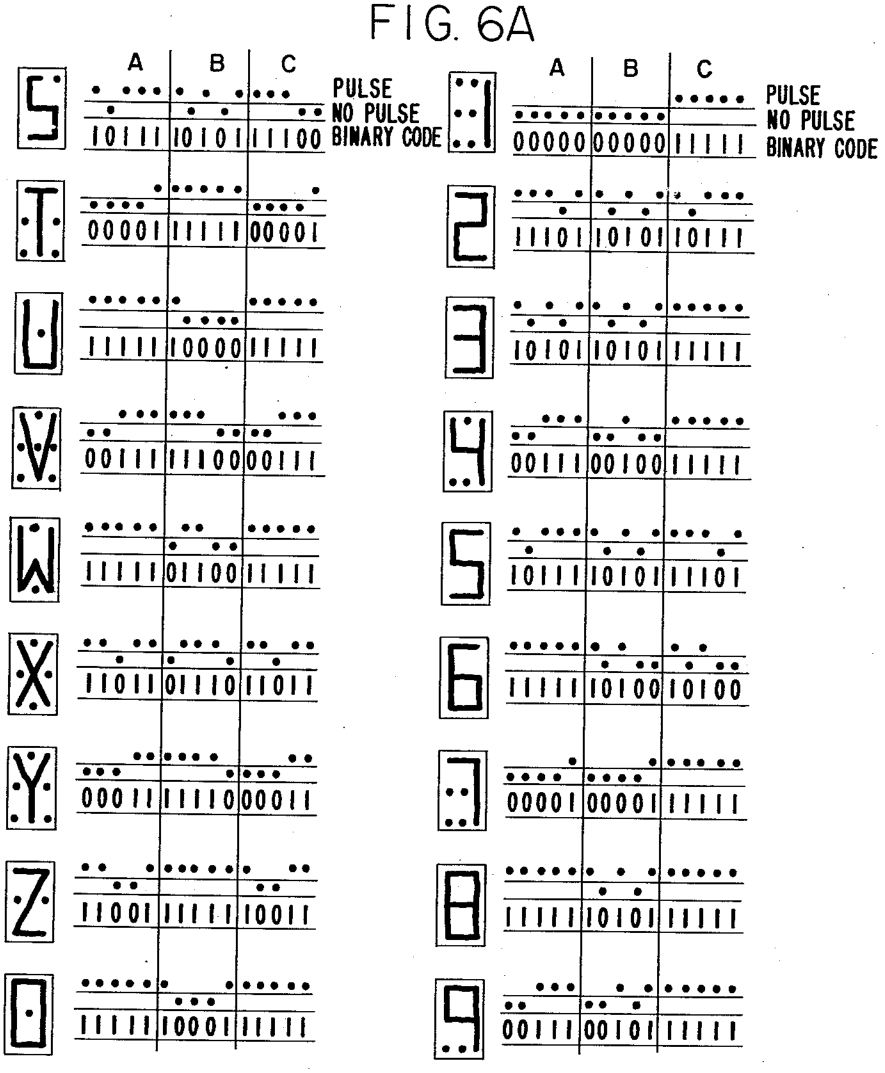
Figure 7:
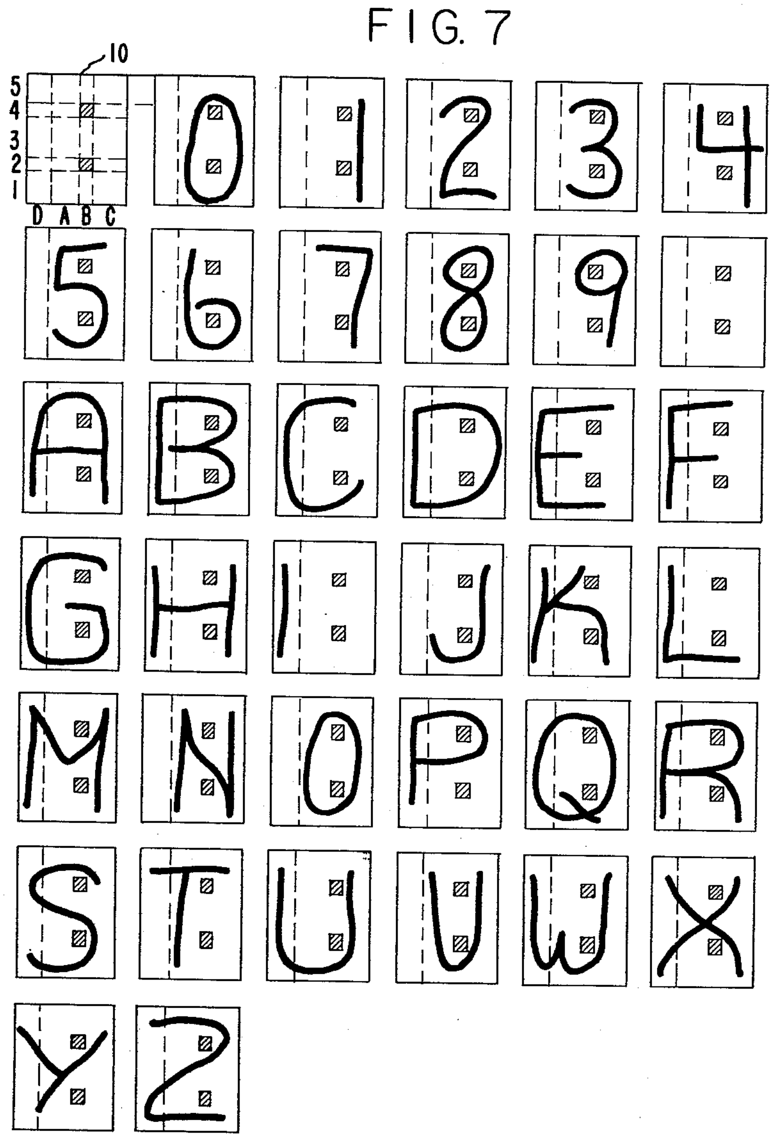
Figure 8A:
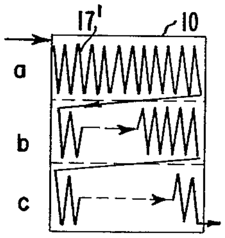
Figure 8B:
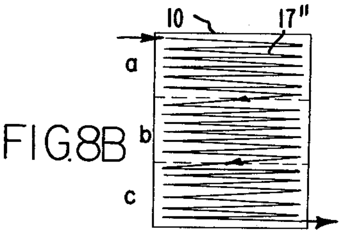
Figure 9A:
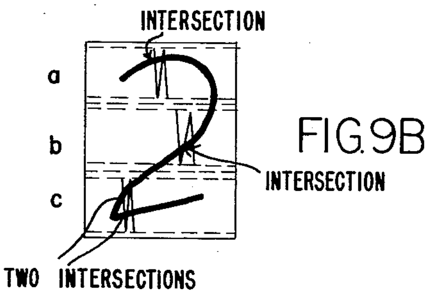
Figure 9B:
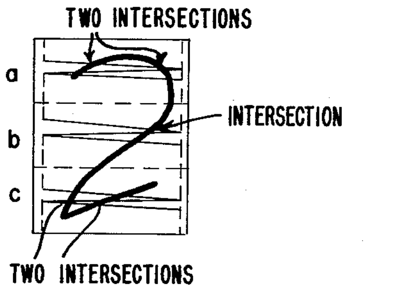
Figure 10:
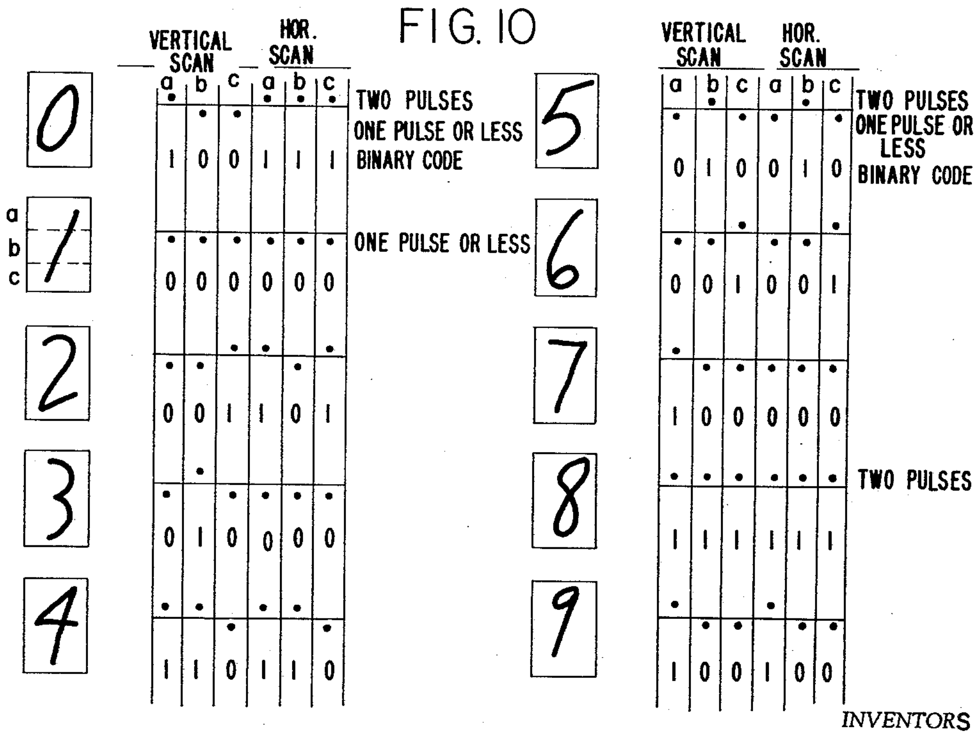

The primary object of this invention is to provide a method and apparatus for character recognition which permits the use of near-normal handwriting procedures on the part of the person writing the record and which is insensitive to a relatively high degree to the existence of foreign matter or blemishes in the record paper. Another object of this invention is to provide a versatile method and apparatus for character recognition having a very high power of individual character discrimination. Yet another object of this invention is to provide a method and apparatus for character recognition which requires the temporary storage and processing of only a relatively small number of bits of information to effect the recognition operation. Other objects of this invention will become apparent from the detailed description and the drawings, in which:

FIG. 1 is a partially schematic representation of a preferred embodiment of apparatus according to this invention, FIG. 2 is a diagrammatic representation on an enlarged scale of a 6-dot reference system for numeral recognition, FIG. 3 is a diagrammatic representation, greatly enlarged, of a single modular rectangle bearing the numeral "3" showing a preferred course of scanning over the total expanse, part of the scanning trace being omitted in the central regions for clarity, FIG. 4 is a diagrammatic representation including a tabulation of both sequence of pulse generation and binary code translation for the system of FIGS. 2 and 3, FIG. 5 is a diagrammatic representation on an enlarged scale of a "prohibited area" reference system for numeral recognition, FIGS. 6 and 6A constitute a diagrammatic representation of a 9-dot reference system, complete with tabulated sequence of pulse generation and binary code translation, for combined numerical and alphabetical recognition, FIG. 7 is a diagrammatic representation on an enlarged scale of a combined prohibited area-4-column reference system for complete numerical and alphabetical recognition, FIGS. 8A and 8B are diagrammatic representations of trace path for individual passes in a preferred two-pass scanning technique, FIGS. 9A and 9B are diagrammatic illustrations of the two types of scanning spot intersection with character elements which occur during the two-pass scanning of FIGS. 8A and 8B, and FIG. 10 is a digrammatic representation, complete with tabulation of pulse generation and binary code translation, of a reference system for numeral recognition suitable for use with the double-pass scanning technique of FIGS. 8A, 8B, 9A, and 9B.

Generally, this invention comprises a method and apparatus for the recognition of characters contrasting in light reflectance or transmittance with respect to the background on which said characters are impressed by determination of the distinctive orientation of the several elements making up individual ones of said characters with respect to a preselected module encompassing single ones of said characters comprising, in sequence, scanning individual ones of said characters and the surrounding area within said preselected module photoelectrically with a scanning spot of diameter smaller than approximately the average width of line in which said characters are represented throughout the full extent of a multiplicity of finite areas each of which has length and width dimensions considerably greater than approximately the average width of line in which said characters are represented and which in sum total the complete expanse of said preselected module, deriving an electrical signal incident to the presence of an element of the character being scanned within any one of said finite areas, and accumulating registrations corresponding to all of said electrical signals derived during said scanning of the complete expanse of said preselected module and different registrations corresponding to specific ones of said finite areas as to which no said electrical signal was derived, said registrations accumulated in the aggregate constituting a unique identification of said character scanned.

The use of this invention to best advantage requires general adherence to somewhat special styles of formats of character representation, several of which are hereinafter described in full detail; however, experience has shown that this occasions very little inconvenience to a person writing the characters, especially when he is aided by preprinted guide indicia carried on the writing paper.

It has been hitherto found to be impossible as a practical matter, to effect successfully the machine recognition of handwritten characters, either numerical or alphabetical, and we have found that one of the principal difficulties has been that individual writing styles, or even repetitious representations of the same character by a single individual, display marked differences one from another which are beyond the discriminatory power of the apparatus. Thus, unless the character conformed to highly rigid standards, such as can be maintained only in first-class machine printing, prior art machine recognition accuracy was found to be prohibitively low. To overcome this difficulty it was necessary to incorporate a broad inherent character recognition discrimination tolerance in the apparatus of this invention, and this has been accomplished, in general, by basing recognition on the orientation of the several elements of any specific character within a relatively small arbitrary number of the finite areas which, in total, make up the modular area encompassing the character.

Discrimination tolerance cannot, however, be established with reference to absolute character distinctiveness alone, because of interfering factors which are not subject to control at the record-reading location and which unavoidably vary within relatively wide limits, such as the presence of optical non-homogeneities in the background on which the characters are handwritten, smudging of pencil lines or other random soiling of the background, failure of the writer's pen or pencil to lay down a constant width or shade of line or, quite often, even a continuous line, and a great variety of other ambient inconsistencies.

This problem has been overcome in the apparatus of our invention by incorporating a second type of discriminatory safeguard which is capable of substantially infallibly appraising marks on the background in detail and in toto, to ascertain, essentially on the basis of statistical considerations, whether a given mark encountered in scanning was consciously intended to be placed on the background or was, in fact, accidental. This is accomplished in two ways, one of which is variable within preselected limits and the other constant. The first is based on the necessity for the occurrence of a predetermined minimum number of detection incidents, corresponding to less than which a mere random optical non-homogeneity will be effectively ignored by the apparatus. This first discriminatory mechanism can be preset by the operator to suit the inherent optical quality as regards optical non-homogeneities of the background material as-received. The second mechanism, which is invariable in the design, is that, lacking a distinctive summation of registrations corresponding to all of the finite areas making up the module, the apparatus can be made, by appropriate control setting, either to ignore any optical representation which does not fall within the repertory of characters which the apparatus is designed to recognize, or to signal that it has encountered one which is beyond its powers of recognition, in which case an attendant can make a visual examination and supply the deficiency.

In furtherance of the obtainment of both of the discriminations hereinabove described as well as to obtain a high signal-to-noise ratio in the electrical circuit pick-up for the scanning system, it is desirable to employ a scanning spot which is at least smaller than the average width of character-writing encountered and, preferably, very substantially smaller. Such a small scanning spot will result in a light transition from essentially full unimpeded strength to complete obliteration, which therefore supplies an unambiguous signal whenever an optical non-homogeneity is encountered during scanning.

Finally, the method and apparatus of this invention are extremely versatile in breadth of design, as will become apparent from the following detailed description, in that very few information transmission channels are required for full range operation, and these may be designed for as regards exact number within relatively wide limits to accommodate existing facilities which are extraneous of our apparatus per se. Also, while a very wide range of electrical signal processing techniques are usable with the invention, the conventional binary code system is eminently satisfactory, which results in great economy in equipment procurement and unsurpassed reliability in service, due to the ability to utilize auxiliary apparatus which is now in very widespread use and which has reached near-perfection in design.

Referring to FIG. 2, the simplest system for character representation, in this case numerals solely, which can be employed with our invention is that hereinafter referred to for brevity as the "6-dot" system, by which is meant that it utilizes six spaced dots 11 as reference indicia for the guidance of the person handwriting the numerals. The module defining the scanning limits is represented visually by the rectangle denoted 10, which itself serves as a guidance index, since the writer understands at the outset that only one numeral is to be written within any one modular rectangle, and the frame-like module fixes the boundary between any one set of six dots 11 and any neighboring set. As indicated for the upper left-hand blank prototype modular rectangle 10 of FIG. 2, it is convenient to consider the rectangular area as made up of a multiplicity of finite areas which, for ease in visualization, are delineated in broken line outline, although in practice they are not provided with line borders. These areas, in this instance, are arranged five in number in each of three vertical columns denoted A, B and C. It is particularly important that the length and width dimensions of a single finite area be considerably greater than approximately the average width of line in which the characters to be recognized are represented. Guidance dots 11 are conveniently disposed in the centers of the areas located at the corners of the modulator rectangle, and also in the centers of the outside areas making up the middle horizontal row, i.e., the third row counted from the bottom.

The upper left-hand modular rectangle 10 of FIG. 2 is shown as provided with preprinted record sheet feed guide indicia 14 and 15 disposed outside of the area included within the modular rectangle, which may be optionally employed as hereinafter described in greater detail to preserve automatic alignment of the record sheet in precise reading position at all times during feeding through the equipment. Indicia 14 and 15 have been omitted from all of the other modular rectangles of FIG. 2 as well as from the other figures for simplicity of representation, it being understood, however, that such indicia are preferably provided for each modular rectangle where automatic record alignment is employed. It is desirable to preserve insensitivity during the photoelectric scanning to the writer guidance dots 11 and also to the boundary lines of modular rectangle 10, especially as regards the latter when photoelectric guiding is not employed. Accordingly, rectangle 10 and dots 11 may be printed in pale blue ink or other suitable color medium, which, when viewed through an appropriately colored filter by the photoelectric character detector hereinafter described, gives no signal at all responsive to the presence of these indicia. In contradistinction, where feed guidance indicia 14 and 15 are utilized it is necessary that these be clearly perceptible to the photoelectric guidance auxiliaries and, therefore, they can be preprinted in black ink or other medium which affords sharp contrast against the record background. Where one-color printing is utilized for both feed guidance indicia and the writer guidance dots 11, the photoelectric guidance auxiliaries hereinafter described may be provided with suitable filters to sensitize them to the color to which the scanning spot is at the same time insensitive.

Reading from left to right in successive columns from top to bottom of FIG. 2, there is shown the representation of the first ten cardinal numbers, i.e., zero to number 9, and it will be seen that the distinctiveness of each numeral is maintained by drawing the individual elements between adjacent guidance dots 11 in the closest approximation to conventional handwriting which it is possible to achieve while, at the same time, substantially maintaining right angles at all points of intersection of adjacent elements of the numerals. It should be mentioned that it is not absolutely necessary to operation, as will become apparent from the description of the scanning utilized, that the numeral element lines faithfully meet each and every dot 11 because of the provision of an inherent tolerance which treats near-conformity in this respect as equivalent to absolute conformity; however, in the interests of writer discipline the optimum standard of numeral representation makes it desirable that the numeral line elements terminate exactly at the dots. It is not necessary that individual line elements be absolutely straight lines and a certain waviness of line is permissible as shown in FIG. 2 without any effect on operation. In a practical test wherein one hundred office workers of average intelligence were requested to write for the first time the numerals according to the 6-dot system of FIG. 2 with no more than a brief three lines of printed directions, and without the benefit of any oral instructions whatever, the results obtained were 95% acceptable in quality, showing that this system is adapted to immediate widespread use as an essentially normal style of character representation.

The term "photoelectric scanning" as employed herein and in the claims is intended to encompass generically the use of a spot of light operating in the dark and maintained in focus in the plane of the record sheet so as to effect scanning over the record surface as well as the use, in the alternative, of an electron beam operating through the agency of a television camera tube or the like in uniform light to effect scanning in precisely the same manner. It is preferred to use the light spot scanning technique because of the greater economy and present commercial practicability of apparatus adapted to perfom this operation and the following detailed description is therefore directed to an embodiment utilizing a scanning light spot, it being understood that, with suitable modifications hereinafter detailed, electron beam scanning is equally effective for the purposes.

Turning now to FIG. 3, a single-pass scanning technique adapted for use with the 6-dot system of numeral representation of FIG. 2 will be described. This technique is illustrated with respect to the numeral 3 and utilizes fifteen finite areas which, in sum, make up the entire modular area, these areas being represented in vertical sequence by numbers 1 to 5 along the left-hand edge of the modular rectangle whereas successive columns from left to right are denoted by the letters A, B, and C.

The path of the scanning spot is represented schematically and to exaggerated scale by a zig-zag trace 17, only part being shown for clarity, threading successively through the complete expanse of areas #1–5 of column A from bottom to top, and then returning by direct vertical linear path to the base of the module for identical ascent through columns B and C in sequence. Preferably, the scanning spot is blanked out by techniques well known to the art during its return course from the top to the bottom of the module, so as not to generate any signal during travel reversal.

From the foregoing it will be apparent that the degree to which light is transmitted through, or reflected from, the character-bearing background area within modular rectangle 10 can be detected by the intersection of the scanning spot with the several character elements, such as the three horizontal lines or the perpendicular line from which these three horizontal lines extend. It will be evident that the time duration of light obstruction by each horizontal element of all of the numerals will be approximately the same, since their lengths are essentially equal and the only variation in the time of constant velocity scanning spot travel thereover will depend on slight variations in alignment between the course followed by the scanning spot and the horizontal lines, variations in thickness of the lines, or the like. Thus, the relative time duration of light obstruction constitutes a poor index for the recognition of individual characters one from another.

This invention effects character recognition by the determination of the orientation of the several elements of a character within the multiplicity of finite areas making up, in sum, the complete module according to the plan for the 6-dot system depicted in FIG. 4. Considering the modular rectangle for the numeral 1 of FIG. 4, it will be seen that there will be no effect on the scanning spot in any of the finite areas #1–5 of columns A and B; however, there will be a definite effect in all areas #1–5, although of somewhat smaller time duration in specific areas #1 and #5, in column C. If time duration considerations are ignored completely, and if the existence of any perceptible effect on the scanning spot is taken to be sure evidence that the presence of a character element within the area has caused the effect, it follows that a single pulse signal registering the fact of intersection is all that is needed to ascertain that a character element extends into any particular finite area as to which such a pulse signal is generated. In FIG. 4 there has been plotted to the right of each numeral for each modular finite area and column the fact of, or absence of, a pulse signal for each finite area of the module together with the conventional binary code translation, wherein 0 represents the absence of a signal and number 1 the existence of a signal. From an examination of the ten cardinal numerals 0 to 9 of FIG. 4, it will be seen that there is provided a highly distinctive pulse signal distribution in time for each individual numeral and that, with suitable information-handling apparatus, character recognition of a highly reliable nature can be attained.

A preferred embodiment of apparatus according to this invention employing a scanning light spot and functioning responsive to light reflection from the background is shown, partially schematically, in FIG. 1, it being understood that each of the components utilized is commercially available in different designs at least one of which is adapted to the purposes. In FIG. 1 the background on which the characters are handwritten is indicated at 19, which may be a sheet of opaque white paper or other medium adapted to receive the impression of a pencil, pen or other writing instrument. Sheet 19 can either be moved continuously from right to left across the sight of the scanning light spot as indicated by the arrow in FIG. 1, or, alternatively, intermittently acting means can be provided to index the record 19 from right to left in accordance with the usual reading convention or in any other manner desired. It will be understood that the light-spot scanning apparatus, record 19 as scanned, the photo-sensitive detector hereinafter described and, in general, the complete optical system is housed in a light-tight enclosure, not shown, to avoid interference from extraneous light.

The apparatus of FIG. 1 utilizes cathode ray tube techniques to effect scanning, the cathode ray oscilloscope tube itself being indicated at 20, disposed with phosphor-coated face directed toward record sheet 19. The primary cycle time control for the entire apparatus is provided by clock oscillator 21, which may be a General Radio Corp. Unit Pulser, Type 1217–A, or the equivalent. Clock oscillator 21 is adapted to generate sequential electrical pulse signals at precise equal-duration time intervals which, by simultaneous transmission through electrical conductors 22 and 23, respectively, controls the scanning pattern and also the operation of the shift registers SR–1 to SR–15, inclusive, in exact coordination with the progress of scanning. Pulse amplifier 24 is interposed between conductor 23 and the common shift line conductor 25 to provide the appreciable operating voltage required by commercial models of shift register, one suitable type of shift register being the single line ferromagnetic design designated Epsco SR2005 marketed by Epsco, Inc., Boston, Mass.

Turning first to the apparatus adapted to control the scanning pattern, it will be seen that oscilloscope tube 20 is provided with the usual pairs of horizontal and vertical electron beam deflection plates 29 and 30, respectively, as well as the cathode element 31, and associated electron beam focusing and accelerating electrodes, not shown, all of which are supplied with operating power from a conventional source, also not shown. Cyclical electron beam deflection voltages are supplied, for horizontal plates 29, from conventional LC radio frequency oscillator 34, and, for vertical plates 30, from sawtooth generator 35.

The deflection plate voltages are supplied to the deflection plates of tube 20 in conventional manner through individual D.-C. amplifiers 38 and 39. Amplifiers 38 and 39 are preceded in the electrical circuit by mixers 40 and 41, respectively, the former being essential to the scanning pattern control, while mixer 41 is necessary only if photoelectric record guiding is employed. Mixers 40 and 41 are conventional electrical signal mixing circuits known to the art which impose on the usual scanning voltages derived from oscillator 34 and generator 35 a control from extraneous sources, enabling presetting of the voltages applied to the deflection plates to levels permitting scanning of each finite area as hereinafter described.

The achievement of an ordered scanning pattern commences with a scale-of-five counter 44 in circuit with conductor 22 and responsive to the output pulse of clock oscillator 21. Counter 44 is adapted to make one count for each pulse signal of oscillator 21, each pulse of oscillator 21 occurring after a predetermined time interval during which the scanning light spot under the influence of oscillator 34 and sawtooth generator 35 scans the entire expanse of a single finite area equal to those designated #1–5, FIG. 3. Counter 44 and subsequent scale-of-three counter 49, hereinafter described, are conventional storage counters of the staircase generator type, such as the design taught in "Pulse and Digital Techniques" by Millman and Taub, McGraw-Hill Book Co., 1956, p. 346 et seq.

The output of counter 44 is transmitted through electrical conductor 45 to the conventional R–C differentiating circuit represented generally at 46, which latter delivers an output pulse once for each five counts of counter 44. The output of 46 is transmitted as single voltage pulses through electrical conductor 47 to scale-of-three counter 49 and through electrical conductor 48 to sawtooth generator 35.

Scale-of-three counter 49 is provided to effect horizontal shifting of the scanning course as an entity from left to right, so that scanning will ensue vertically in sequence from the bottom to the top of columns A, B, and C (FIG. 3) in the order recited. This is effected by the rise of the voltage level in counter 49 a predetermined amount corresponding to each multiple of five counts tolled by scale-of-five counter 44. The voltage output of counter 49 is applied to the horizontal deflection plates 29 through electrical conductor 53, and this alters the potential level thereon the necessary amount to shift the electron beam to the right the precise distance necessary to bring scanning into line with the next-following of the columns A, B, and C. As a practical matter precise conformation of scanning with the boundaries of the several finite areas is not necessary, since the line elements making up the characters being scanned lie in the middle regions of the areas and thus will not be encountered ambiguously by the scanning spot even if there is a slight crossing over of the boundaries or, conversely, failure to quite reach these boundaries. At the end of each scanning cycle the potential of deflection plates 29 is restored to the initial level existing at the beginning of the scanning cycle by the discharge occurring in scale-of-three counter 49 incident to the completion of its count.

Sawtooth generator 35 provides a steadily rising voltage to vertical deflection plates 30 until the scale-of-five counter 44 delivers a pulse through conductor 45 to differentiator 46 and thence through conductor 48 to sawtooth generator 35, at which instant the potential level of generator 35 is abruptly restored to the original level, by which time a single vertical column of scanning, i.e., A, B or C, has been completed and the circuits restored to the original condition for accomplishing the next vertical scan in sequence. Due to the differentiator action the restoration of potential on vertical deflection plates 30 to the original level occurs only once for each multiple of five counts by counter 44, thus permitting complete scanning of a single column A, B or C before going to the next.

Thus, in the course of each scanning cycle, the existing potential on deflection plates 29 and 30 changes continuously in three repeated sub-cycles corresponding to the five-area columns A, B and C, each displaced horizontally from the other so that they approximately abut neighboring columns, without interfering overlap or clearance therebetween, under which circumstances the scanning light spot traces a regular small-pitch course indicated schematically at 17, FIG. 3, over substantially the entire included area of single modular rectangles 10.

Where photoelectric registration of the record sheet 19 is not provided, conventional pinch roll or feed tape record feeding and orienting apparatus of standard design incorporated in office record handling equipment can be utilized to move record sheet 19 through the scanning apparatus and obtain approximate registration of each modular rectangle in scanning position. However, it is necessary to inactivate the scanning operation during the time interval that one modular rectangle is succeeding another in the sight of the scanning spot so as to insure that scanning starts at the appropriate geographical point with reference to each modular rectangle 10 in turn and, as a practical matter, this is most conveniently accomplished photoelectrically, so that it happens that very precise photoelectric registration can be obtained as an added feature with the expenditure of only slightly greater effort.

At the outset it should be mentioned that photoelectric registration as employed in this invention involves shifting the course of the scanning raster in space, as distinguished from physically moving record sheet 19, which therefore is highly advantageous as regards enhanced speed of response, mechanical simplicity and also guidance fidelity.

Registration is effected with modular rectangles bearing the indicia 14 and 15 of FIG. 2 by utilizing mark 14 as the horizontal reference guide and mark 15 as the vertical reference guide. This is effected by viewing the small square mark 14 with a single photoelectric detector 57 and the elongated mark 15 along its upper and lower edges respectively with individual photoelectric detectors 58 and 59, utilizing suitable intermittently operated light sources, light masks and focusing lenses, not shown, as an aid to sharpened perception as required. It will be understood, of course, that the registration light sources will be extinguished after registration is effected and before scanning by light spot begins.

In the circuit of FIG. 1, during registration of sheet 19, a drop in output voltage from detector 57 occurs upon the transition from light to dark which takes place when mark 14 intrudes on the field of sight of 57. The resulting pulse is transmitted through electrical conductor 60 to amplifier 61 and the output pulse from the amplifier is transmitted simultaneously through electrical conductor 62 to both clock oscillator 21 and blanking flip-flop 63, which latter may be of the conventional Eccles-Jordan type known to the art. The output pulse from amplifier 61 at the same time extinguishes the registration light sources hereinbefore described through conventional circuitry not shown. The output of amplifier 61 is thus utilized to initiate operation of clock oscillator 21, which thereupon delivers its output to both scale-of-five counter 44 and the shift registers SR–1 to SR–15, hereinbefore described. However, to terminate scanning positively at the end of the inspection of each individual modular rectangle 10 there is provided yet another counter, namely 64, which is a scale-of-fifteen counter of the same general design as counters 44 and 49 already described. Counter 64 is connected in electrical circuit with conductor 22 through conductor 68, so that it is simultaneously set in operation with scale-of-five counter 44. The function of scale-of-fifteen counter 64 is to toll out a complete scanning cycle and, at the end, switch off clock oscillator 21, which it does by delivery of an output pulse signal to oscillator 21 through electrical conductor 69. Blanking flip-flop 63 is simultaneously actuated by pulse signal transmission from counter 64 through electrical conductor 70 to change the bias voltage on cathode element 31 through electrical connection 71 to thereby extinguish the scanning light spot at the appropriate time. It is convenient to utilize the output pulse of scale-of-fifteen counter 64 to switch on the lights utilized to iluminate registration indicia 14 and 15, thereby restoring the apparatus to condition permitting the scanning of the next modular rectangle 10 in sequence, and this is effected by conventional circuitry not shown. Conductor 70 is also connected in circuit with non-storing decoder matrix 80 to coordinate the latter's operation in proper time sequence with the completion of each scan of a specific modular rectangle 10, all as hereinafter described in detail.

In preferred operation sheet 19 is fed through the apparatus continuously, the speed of scanning being so great that high time rates of record sheet feed can be accommodated. It will be understood that, to accomplish this, the time constants of the several appurtenances in the electrical circuit are proportioned in design to be so short that, at any preselected speed of record throughput, scanning and information perception occur so rapidly that, insofar as the scanning apparatus is concerned, there is no interfering relative motion between record 19 and tube 20. With continuous record feed, mark 14 clears the sight of photo detector 57 within a very short interval of time but, in any case, appreciably later than is required for complete scanning to have taken place. There occurs then a transition from dark to light which causes detector 57 to generate another voltage signal pulse which is transmitted to amplifier 61 through conductor 60. However, since this pulse is of opposite polarity as compared to that generated in the previous transition from light to dark, amplifier 61 does not deliver any signal through conductor 62 and scanning therefore is retained suspended until the next-following mark 14 intrudes on the sight of detector 57, at which time the newly presented modular rectangle 10 with which this mark 14 is associated is scanned as a new entity.

Vertical registration of the raster of tube 20 is obtained by light balance between photodetectors 58 and 59, one trained on the upper border of elongated mark 15 and the other on the lower border. These detectors each transmit a continuous D.-C. voltage signal through conductors 81 and 82, respectively, to conventional balanced differential amplifier 83. The output voltage of amplifier 83 is applied at proper polarity through conductor 84 to mixer 41, previously described, where it is superposed on the output of sawtooth generator 35 so that the tube 20 electron beam positioning voltage level applied to vertical deflection plates 30 is altered in the precise amount and polarity required to maintain the raster of scanning tube 20 always within the bounds of the particular modular rectangle in process of scanning.

Turning now to the optical elements of the apparatus of FIG. 1, the scanning light spot generated by tube 20 is focused by double convex lens 88 in the plane of record sheet 19 and follows scanning course 17, FIG. 3, incident to the travel of the electron beam which generates the light spot by impingement on the phosphor-coated face of tube 20. The existence or non-existence of specific character elements within specific finite areas making up the expanse of modular rectangle 10 is sensed by reflectance from sheet 19 to photomultiplier detector 89, which is masked by optical filter 90 of a suitable color rendering detection insensitive to the presence of writer guidance indicia 11 and also to the outline of rectangle 10. The distinctive output signal of photodetector 89 is a succession of discrete voltage pulses which vary in magnitude depending upon the existing light reflectance. This output is transmitted through electrical conductor 91 to conventional tuned radio-frequency amplifier 92, which can be pre-adjusted to pass a signal only when a predetermined minimum number of input pulses is exceeded. Thus, amplifier 92 constitutes a variable sensitivity control, hereinbefore alluded to, adapted to accommodation to background optical non-homogeneities, such as smudged pencil lines, dirt or the like, so as to effectively ignore these random causes of variation in light reflectance while, at the same time, retaining full perception acuity as regards the characters in scan.

The output from amplifier 92 is passed as discrete voltage pulses to the first of the sequence of shift registers, designated SR–15 in FIG. 1, through electrical conductor 93. Individual shift registers SR–1 to SR–15, inclusive, only four of which are shown in FIG. 1, are identical in design and are such that each is adapted to register the first signal received by attainment of a characteristic magnetic state, after which the particular register remains oblivious to all subsequent input signals until it is cleared. Shift registers SR–1 to SR–15 are connected in series sequence in the reverse order of enumeration, SR–14 following SR–15, SR–13 following SR–14, etc., so that clearance of the preceding register steps any signal registered therein to the next-following register through the electrical conductors designated generally at 95. Finally, each shift register is provided with an output signal line 99 running to the input side of decoder matrix 80.

Decoder matrix 80 can conveniently be of the diode type, such as the design described in the I.R.E. Proceedings, February 1949, p. 139 et seq., the function of which is to correlate in the aggregate the information registered in the multiplicity of shift registers with the repertory of characters which the apparatus is designed to recognize and, upon recognition achieved, send an output signal through a specific line 100 which thereupon actuates a printer or other device, not shown, to reproduce the particular character whose scanning has just been completed.

In operation, a typical modular rectangle 10 such as that bearing the numeral "2," FIG. 1, comes within view of oscilloscope tube 20 during continuous feed of record sheet 19 and scanning commences upon registration being effected through photodetector 57 sensing the presence of mark 14 within its sight. As previously described the scanning cycle is initiated by a voltage pulse through conductor 62 from amplifier 61, which simultaneously starts clock oscillator 21 and activates cathode 31 of tube 20 through blanking flip-flop 63. Responsive to start-up of clock oscillator 21, scale-of-five counter 44 and scale-of-fifteen counter 64 simultaneously commence their cycles of operation.

At this instant the scanning light spot starts at the beginning of its course 17 within finite area #1, column A, as depicted in FIG. 3. In scanning this finite area the spot will encounter the lower left-hand element of numeral 2 (refer numeral "2" modular rectangle, FIG. 4) and the light reflected from record sheet 19 will vary to thereby cause pulse variations in the output of photodetector 89 which, after exceeding the number preset on tuned amplifier 92, are transmitted through conductor 93 to SR-15. As previously explained, SR-15 is actuated only by the first strong pulse it receives and, even though a considerable portion of the character element in the finite area in scan may be missing or obliterated, it requires but one clear signal over and above the threshold of amplifier 92 to register the presence of a character element within the particular area. Once SR-15 is actuated, any further signals from detector 89 are completely superfluous and, obviously, gross shape of the character, element position within the particular area, size of line in which represented, and other like peculiarities are not appraised as recognition factors. The fact of existence of an element of numeral 2 in area #1, column A, is thus representable as a single pulse, as indicated schematically to the right of the specific modular rectangle for "2" in FIG. 4.

The time in which the scanning light spot passes over finite area #1, column A, is set equal to the interval between pulses of clock oscillator 21 by preadjustment of the gain in mixer 41. At the end of each time interval during the scanning process, clock oscillator 21 delivers a voltage pulse to amplifier 24 which, in turn, delivers a shift pulse through line 25 to all of the shift registers SR-15 to SR-1 simultaneously. This shifts any stored signal existing within a specific shift register to the next register in sequence, i.e., in this instance from SR-15 to SR-14, since this is the only stored signal involved. Had there been no signal stored in SR-15, this fact would still be preserved in the time sequence of information sensed, because a blank would then be stepped along in the precise order in which it was encountered during the scanning of the numeral 2. Exactly this takes place with respect to finite areas #4, column A, #2 and #4, column B, and #2, column C, as shown in FIG. 4, the existence of numeral elements in all of the other finite areas being denoted by a single pulse registered during the time interval in which each was scanned in the order following course 17 of FIG. 3. Thus, at the end of scanning all of the finite areas #1 through #5 in all of the columns A, B and C, inclusive, SR-1 contains a registration corresponding to the signal initially fed into SR-15 and each of the other shift registers SR-2 through SR-15, inclusive, carry registrations corresponding to a signal or absence of signal, as the case may be, sensed for predetermined individual finite areas of individual columns. An individual shift register is thus available for each finite area of the particular scanning plan utilized and the circuit arrangement of the individual shift registers is such that the disposition of each registration in time is preserved throughout the stepping process by which the registrations are accumulated. The aggregate of these registrations in the order of their accumulation constitute a representation unique to the numeral 2.

Upon the completion of the scanning cycle, scale-of-fifteen counter 64 will have tolled its course and a voltage pulse is thereupon transmitted through line 70 to flip-flop 63 and to decoder matrix 80 simultaneously. Filp-flop 63 biases cathode 31 to cut-off and the scanning light spot is thereupon immediately extinguished. The voltage pulse to decoder matrix 80 constitutes one coordinate voltage for the matrix, the other of which, collectively, is that contributed by the registers SR-1 to SR-15, inclusive. It will be understood that a permanent closed electrical circuit exists between each of the shift registers and matrix 80, so that successive shift pulses in line 25 from the first through the fourteenth in number cause passage of voltage signals through the matrix back to the power source; however, the matrix does not perform a decoding operation until the count of fifteen, when all bits of information sensed in the complete scanning of a specific modular rectangle 10 have been accumulated as registrations in SR-1 to SR-15, inclusive. Then, simultaneous occurrence of the fifteenth shift pulse delivered from pulse amplifier 24 to shift line 25 and the activating pulse supplied to decoder matrix 80 from counter 64 momentarily completes a unique circuit within the matrix in a manner understood by those skilled in the art and permits passage of the activating pulse through this unique circuit to output via a preselected one of the lines 100 reserved for the specific character to which the particular unique circuit is allocated. Thus, in the case of the numeral 2 specifically described, decoder matrix 80 transmits an actuating voltage signal to the particular line 100 reserved for "2," thereby effecting a printing or other operation as desired. To insure complete handling of all information received, even where for some reason there is a failure of recognition, decoder matrix 80 is provided with a unique circuit and associated error signal line 101 which is adapted to transmit a characteristic signal upon encounter with a malformed character or other failure, so that visual inspection or alternative supplementary action can be had to render the recognition certain, or to otherwise supply the deficiency.

It will be apparent that decoder matrix 80 may operate punches, magnetic recorders or other devices instead of printing apparatus to thereby record in code the fact that particular numerals have been recognized by the apparatus. Such records can subsequently be conveniently processed by conventional binary code techniques, such as that in which the order and occurrence of "ones" and "zeros" constitute a unique identification of specific numerals, and a corresponding translation according to such a code is portrayed schematically adjacent the individual characters of FIG. 4 to show the distinctiveness of aggregate signal obtained. Also, decoder matrix 80 may conveniently incorporate considerably more than ten individual recognition circuits, thereby making it possible to process a number of symbols signifying various arithmetic operations, such as addition, subtraction, multiplication or division, together with decimal points, dollar or cents signs and the like, which have been omitted from the drawings for purposes of clarity.

The foregoing detailed description has been directed to the processing of single numbers or characters but this invention is by no means so limited. Individual modular rectangles are reserved for a single number or character, but adjacent rectangles in sequence can be utilized to represent any multidigit number or multiletter word which may be desired. A great number of ways known to the art are available for coordinating the input of information with the output of our invention to preserve the discrete spacing which separates an individual multi-digit number or a multi-letter word from its neighbors.

Scale-of-fifteen counter 64 supplies an output pulse corresponding to each modular rectangle 10 presented to the apparatus and suitable programing equipment may therefore be provided responsive thereto to index the output record to preserve exact coordination with the feed of the input record and thereby maintain individuality of words or numbers as received. A particularly convenient record coordination is obtainable by providing an output line for decoder matrix 80 reserved for the receipt of no photoelectric signal at all during the interval between successive output pulses of counter 64, i.e., determinative of the encountering of a blank modular rectangle 10. Such a matrix line, coordinated in operation with the receipt of the usual output pulse from counter 64, would be effective to control the feed of the output record, whatever the nature of this record may be, in strict accordance with modular rectangles as presented during input feed, so that order in this regard is automatically maintained without any possibility of deviation.

The method and apparatus of this invention have been described in detail with reference to the six-dot system of character representation, because that is perhaps the simplest. However, certain other systems have been devised which possess specific advantages and this invention is sufficiently versatile so that it can be utilized with any of the following plans with relatively slight modifications in circuit over that shown in FIG. 1.

Thus, one can dispense with dot indicia 11 altogether and rely on "prohibited areas" blocked out in pale blue ink to guide the writer in his numeral delineation. This system is depicted in FIG. 5 wherein the modular rectangles 10 are provided with "prohibited areas" 105 which, in this instance, correspond with finite areas #2 and #4 of column B. The system of FIG. 5 requires that the numerals be written in the manner illustrated therein, without any intrusion thereof into the prohibited areas. It will be seen that the "prohibited area" system preserves, to a large degree, the writer's freedom to employ arcuate elements in the drawing of his numerals, which has some psychological advantage over the straight-sided figure renditions of the six-dot system. If desired, to permit the figures to take forms even more natural in appearance, the relative sizes of the finite areas containing the prohibited areas together with the neighboring finite areas in line therewith horizontally and vertically may be appreciably reduced in size over the remaining areas. However, the latter variation introduces problems in proportioning the timing of the pulse output of clock oscillator 21 in conformity therewith, and this is usually objectionable.

Yet another system which is entirely suitable for the representation of all of the letters of the alphabet together with the numerals 0 to 9, inclusive, and also various arithmetic operation and other symbols not shown, is the 9-dot system depicted in FIGS. 6 and 6A.

Here, as in the 6-dot system, there are a total of fifteen finite areas and the writer's guide indicia are pale blue dots disposed in the centers of the first, third and fifth finite areas of each of the three columns A, B and C. Essentially straight lines are used to draw the various letters and numerals and somewhat special conventions must be adhered to with respect to the letters B, D, K, O, Q, R, and S. The numeral representation is identical with that for the 6-dot system shown in FIGS. 2 and 4. It will be understood, of course, that the broadening of the recognition repertory to include the full alphabet as well as the first ten integers requires that a decoder matrix 80 be employed which has a corresponding number of individual character circuits, each reserved for a single one of the characters processed, but apparatus of appropriate size can readily be constructed using the design hereinbefore described in connection with the apparatus of FIG. 1.

Still another system which can be utilized for the complete alphabet and the numerals 0 to 9, inclusive, as an example, is that illustrated in FIG. 7, the corresponding pulse and binary code representations being omitted to save space. This system utilizes a combination of prohibited areas and a fourth vertical column, and the vertical and horizontal tiers of finite areas containing the prohibited areas are made appreciably narrower in height or width than the other finite areas. As shown for the upper left-hand modular rectangle 10 of FIG. 7 there are a total of twenty finite areas, and the sequence of scanning is from bottom to top in order through columns A, B and C, followed finally by scanning of grids #1 to #5, inclusive, in the sequence recited in column D. Thus, the scanning requires a somewhat more complicated programing than those previously described and also utilizes unequal time intervals for the scanning of the two specific sizes of finite areas involved; however, these problems can be solved by alterations in design of the apparatus of FIG. 1 within the skill of the art.

Numeral representation for the system of FIG. 7 is identical in style with that of FIG. 5, except that the writer is free to use more natural strokes and relative proportions of the several parts of his numerals than in the system of FIG. 5, due to the fact that the prohibited areas are relatively small in expanse compared to the finite areas which are open to line drawing. The fourth vertical column, denoted column D in FIG. 7, is reserved exclusively for elements of the letters of the alphabet, it being understood, however, that certain of the letters do not extend into column D, these being J, N, O, and V. Column D therefore affords a gross distinction between alphabetical letters and numerals which is a primary aid to the electrical discrimination circuit of the apparatus. The inherent distinctiveness of the letters J, N, and V are sufficient to set these apart from the first ten numerals and thus they do not require the fourth column, and the letter "O" is identical with the zero so that distinctiveness rests on context as regards this character.

The advantage of the system of FIG. 7 is that the writer is enabled to use a somewhat freer and more natural style than he can with the system of FIGS. 6 and 6A, although at the cost of appreciably more complicated circuitry.

In all of the systems hereinbefore described the writer's freedom as regards the use of slanted lines in character representation is rather severely limited. More important, information processing with the systems of FIGS. 2–7, inclusive requires the use of fifteen or an even greater number of separate channels for code transmission whereas a rather extensively available telegraphic system has only seven channels. Accordingly, the two-scan system represented in FIGS. 8A, 8B, 9A, 9B and 10 was evolved for the numerals 0 to 9, inclusive, discrimination here being based on the fact that two intersections of the scanning spot with character elements during a particular mode of scanning is required, as distinguished from only one, to register the fact that a line element lies within a finite area of the modular rectangle 10.

Referring to FIGS. 8A and 8B, the expanse of the modular rectangle 10 with this system is subdivided into three equal-area finite areas denoted *a*, *b* and *c* in order from top to bottom. One scanning course (FIG. 8A) is in sweeps from top to bottom as indicated by trace 17′ across the full width of 10 within finite area *a* until the right-hand boundary is reached, after which the scanning spot is returned, preferably blanked out, to the left-hand edge of 10 when the vertical scan is repeated in identical fashion but confined solely to finite area *b*, followed finally by scanning of finite area *c* in exactly the same manner as for areas *a* and *b*. This completes one pass of the scan, which is then followed by the second pass as indicated by trace 17″ depicted in FIG. 8B. Preliminary to the second pass the scanning spot is returned, preferably blanked out, to the upper left-hand corner of finite area *a* and started out on its scanning course 17″ from left to right across the full width of the modular rectangle but at steadily increasing separation from the upper edge of rectangle 10. The second pass 17″ extends in unbroken succession over the full expanse of finite areas *a*, *b* and *c* in turn, with final blanking out at the lower right-hand corner of area *c*.

Turning now to FIGS. 9A and 9B, two-pass scanning is demonstrated with rsepect to the numeral 2. At the outset, it is essential to operation that the numerals be written in a style dictated by the system which, in this case, necessitates that the lower bar of the numeral 2 be drawn with an upward slant. The only other changes in character representation can be appraised from FIG. 10, and these are limited to drawing the lower elements of numerals 3 and 5 with a somewhat downward slant while, at the same time, drawing the upper bar of the 5 with an upward slant similar to that for the base of the numeral 2. It is noteworthy that this system allows an extremely close approach to free-style numeral writing and is, for this reason, favored by some business administrators.

Two-pass scanning in FIGS. 9A and 9B involves, individually, the vertical scan of FIG. 9A and the horizontal scan of FIG. 9B. Unless there occur at least two intersections with a line element during a single sweep of the scanning spot, the underlying rationale of this system is that there be registered no existence of a line element within a particular finite area. Two separate passes, of course, provide a considerably greater number of possibilities of multiple intersections during the sweeps of the scanning spot than would be possible with any single-pass technique.

Pursuant to FIGS. 9A and 9B, the vertical pass of FIG. 9A fails to produce a multiple intersection of scanning spot with line element during any single sweep over finite areas *a* and *b*, but does result in two or more such intersections within finite area *c*. Similarly, the horizontal pass of FIG. 9B produces double intersections in both of areas *a* and *c*, but not in area *b*. With suitable alteration of the detection circuit of FIG. 1, which might entail the provision of a monitoring counter for precounting intersections per sweep before transmission of any signals to the shift registers, a distinctive succession of pulses or no pulses is obtained, which is represented to the right of the numerals of FIG. 10. The corresponding binary code translation is provided immediately below the pulse-no pulse delineation and it will be seen that there are only six data fragments in the sequence. Accordingly, the apparatus requires only six shift registers, instead of the fifteen for FIG. 1, and seven-channel telegraphic transmission is entirely suitable, with one channel to spare for error signal transmission or the like.

It will be understood that a great number of different circuits, each with its peculiar advantages, can be devised for processing the scanning data transmitted from the photodetector 89. As an example, in the system of FIGS. 8–10 it may be desirable to register separately the facts of both single and double intersections of scanning spot sweeps with line elements, thus providing additional recognition data as regards individual character elements. There would thereby be secured a more positive recognition of numerals such as "1," which is detected in the system hereinbefore described in detail more or less by default, since it is the numeral as to which no double intersections at all occur.

While the foregoing detailed description specifically concerns scanning with a light spot, a television camera tube may conveniently be utilized in place of oscilloscope tube 20 for the scanning, with some accompanying advantages. A suitable television camera tube for the purposes is of the type known as the "vidicon," which is described at p. 109, "Fundamentals of Television Engineering" by G. M. Glasford, McGraw-Hill Book Co., Inc., New York. The camera tube, in effect, incorporates a photo detection device within itself and thus detector 89 of FIG. 1 can be dispensed with. The television camera tube receives its image of specific characters by viewing sheet 19 through a suitable lens or lenses substituted for lens 88. The character image would be scanned from the inside face of the tube in accordance with conventional practice by an electron beam having a path of travel conforming to a plan such as one of those hereinbefore described. This scanning can be controlled by the circuit auxiliaries detailed in FIG. 1 to follow the chosen pattern of spot travel over the modular rectangles, and the tube voltage output passed to a video amplifier and thence to tuned amplifier 92 and the equipment described in circuit therewith. Tube electron gun control and other circuit details can readily be resolved to meet specific circumstances by persons skilled in the art and aided by the foregoing description.

It will be understood that use of a camera television tube requires general illumination of the field of view of sheet 19 at all times and there would thus be provided uninterrupted coincidental illumination of registration guide indicia 14 and 15 upon which sheet registration is based as hereinbefore described.

Preferred operation according to this invention utilizes reflected light; however, transmitted light is equally effective for the purposes and therefore transparent or semitransparent record sheets 19 may be utilized as the recording medium if desired. Also, the invention is adapted to use in conjunction with a very wide variety of record sheet advancing and registration methods and devices known to the art, so that no limitations to very widespread use of the invention exist in this respect.

The five separate systems of character representation which have been described in detail constitute only typical examples of the versatility of application of this invention as regards both style and repertory and, obviously, there exists a very large measure of freedom of design in this respect to more readily attain the objectives sought in each particular situation.

From the foregoing, it is apparent that this invention is capable of very extensive modification within the skill of the art without departure from its essential spirit and it is therefore intended to be limited only by the scope of the following claims.

What is claimed is:

1. The method of achieving recognition of characters inscribed according to a preselected style and format and contrasting in light reflectance or transmittance with respect to the background on which said characters are impressed by determination of the distinctive orientation of the several elements making up individual ones of said characters with respect to a preselected module encompassing single ones of said characters comprising, in sequence, scanning individual ones of said characters and the surrounding area within said module photoelectrically with a scanning spot of diameter smaller than approximately the average width of line in which said characters are represented throughout the full extent of a multiplicity of finite areas each of which has length and width dimensions considerably greater than approximately the average width of line in which said characters are represented and which in sum total the complete expanse of said preselected module, deriving an electrical signal incident to the presence of an element of the character being scanned within any one of said finite areas, and accumulating registrations corresponding to each of said electrical signals derived during said scanning of the complete expanse of said preselected module and different registrations corresponding to specific ones of said finite areas as to which no said electrical signal was derived, said registrations accumulated in the aggregate constituting a unique identification of said character scanned.

2. The method of achieving recognition of characters inscribed according to a preselected style and format and contrasting in light reflectance or transmittance with respect to the background on which said characters are impressed according to claim 1 wherein said multiplicity of finite areas which in sum total the complete expanse of said preselected module is in the range of about 3 to 15 in number.

3. The method of achieving recognition of characters inscribed according to a preselected style and format and contrasting in light reflectance or transmittance with respect to the background on which said characters are impressed according to claim 1 wherein said scanning is effected in the dark with a scanning spot of light of diameter smaller than approximately the average width of line in which said characters are represented.

4. The method of achieving recognition of characters inscribed according to a preselected style and format and contrasting in light reflectance or transmittance with respect to the background on which said characters are impressed according to claim 1 wherein said scanning of said individual ones of said characters and the surrounding area within said module is effected in two separate passes of said scanning spot, the general direction of travel of said scanning spot during one of said passes being substantially normal to the general direction of travel of said scanning spot during the other of said passes.

5. An apparatus for achieving recognition of characters inscribed according to a preselected style and format and contrasting in light reflectance or transmittance with respect to the background on which said characters are impressed by determination of the distinctive orientation of the several elements making up individual ones of said characters with respect to a preselected module encompassing single ones of said characters comprising in combination scanning means projecting a scanning spot along a predetermined path in sequence throughout a multiplicity of finite areas which in sum total the complete expanse of said preselected module, photoelectric detection means directed toward said character and background responsive to the occurrence of an intersection of said scanning spot with an element of said character to thereby detect the presence of an element of said character within any one of said finite areas by development of an electrical signal, individual registration means in electrical circuit with the output from said photoelectric detection means each accumulating one said electrical signal, and means coordinated with scanning to step along said registration means so that a different individual registration means is in electrical circuit with said photoelectric detection means during the scanning of individual ones of said finite areas to thereby provide in the aggregate, by order of registration or non-registration, a unique identification of said character.

6. An apparatus for achieving recognition of characters according to a preselected style and format and contrasting in light reflectance or transmittance with respect to the background on which said characters are impressed according to claim 5 wherein said scanning means consists of a cathode ray oscilloscope tube.

7. An apparatus for achieving recognition of characters according to a preselected style and format and contrasting in light reflectance or transmittance with respect to the background on which said characters are impressed according to claim 5 wherein said scanning means consists of a television camera tube.

8. An apparatus for achieving recognition of characters inscribed according to a preselected style and format and contrasting in light reflectance or transmittance with respect to the background on which said characters are impressed by determination of the distinctive orientation of the several elements making up individual ones of said characters with respect to a preselected module encompassing single ones of said characters comprising in combination scanning means projecting a scanning spot along a predetermined path in sequence throughout a multiplicity of finite areas which in sum total the complete expanse of said preselected module, photoelectric detection means directed toward said character and background responsive to the occurrence of an intersection of said scanning spot with an element of said character to thereby detect the presence of an element of said character within any one of said finite areas by development of an electrical signal, individual registration means in electrical circuit with the output from said photoelectric detection means each accumulating one said electrical signal, and a clock oscillator delivering voltage pulses in a predetermined sequence with respect to time operative to coordinate scanning with the stepping along of said registration means so that a different one of said individual registration means is in electrical circuit with said photoelectric detection means during the scanning of individual ones of said finite areas to thereby provide in the aggregate, by order of registration or non-registration, a unique identification of said character.

9. An apparatus for achieving recognition of characters according to a preselected style and format and contrasting in light reflectance or transmittance with respect to the background on which said characters are impressed by determination of the distinctive orientation of the several elements making up individual ones of said characters with respect to a preselected module encompassing single ones of said characters comprising in combination scanning means projecting a scanning spot along a predetermined path in sequence throughout a multiplicity of finite areas which in sum total the complete expanse of said preselected module, photoelectric detection means directed toward said character and background responsive to the occurrence of an intersection of said scanning spot with an element of said character to thereby detect the presence of an element of said character substantially anywhere within any one of said finite areas by development of an electrical signal, individual registration means in electrical circuit with the output from said photoelectric detection means each accumulating one said electrical signal, and a clock oscillator delivering voltage pulses in a predetermined sequence with respect to time operative to coordinate scanning with the stepping along of said registration means so that a different one of said individual registration means is in electrical circuit with said photoelectric detection means during the scanning of individual ones of said finite areas to thereby provide in the aggregate, by order of registration or non-registration, a unique identification of said character, said clock oscillator being connected with output in parallel electrical circuit with (1) a first electric pulse counter of scale equal to the total number of said finite areas encompassed within said preselected module, (2) a second electric pulse counter of scale equal to the number of finite areas within said preselected module disposed along a first preselected linear axis, and (3) the shift side of an array of shift registers equal in number to the total number of said finite areas encompassed within said preselected module, a third electric pulse counter connected in the output circuit of said second pulse counter of scale equal to the number of finite areas within said preselected module disposed along a second preselected linear axis normal to said first preselected linear axis, means in electrical circuit with the individual outputs of said second and third pulse counters operative, respectively, to constrain said scanning along predetermined substantially contiguous paths referred to said first preselected linear axis and said second preselected linear axis within said preselected module, and a decoder matrix in the output electrical circuit of said first pulse counter operative to decode the stored registrations within said registration means upon the achievement by said first pulse counter of a count equal to the total number of said finite areas encompassed within said preselected module.

References Cited in the file of this patent

UNITED STATES PATENTS

| | | |
|---|---|---|
| 2,615,992 | Flory | Oct. 28, 1952 |
| 2,616,983 | Zworykin | Nov. 4, 1952 |
| 2,741,312 | Johnson | Apr. 10, 1956 |
| 2,889,535 | Rochester | June 2, 1959 |
| 2,894,247 | Relis | July 7, 1959 |
| 2,897,481 | Shepard | July 28, 1959 |
| 2,905,927 | Reed | Sept. 22, 1959 |

OTHER REFERENCES

"Photoelectric Reader Feeds Business Machines," by Shepard and Heasly, Electronics, May 1955.

"Character Recognition," by Glauberman, Electronics, February 1956, pp. 132 to 136.